UNITED STATES PATENT OFFICE.

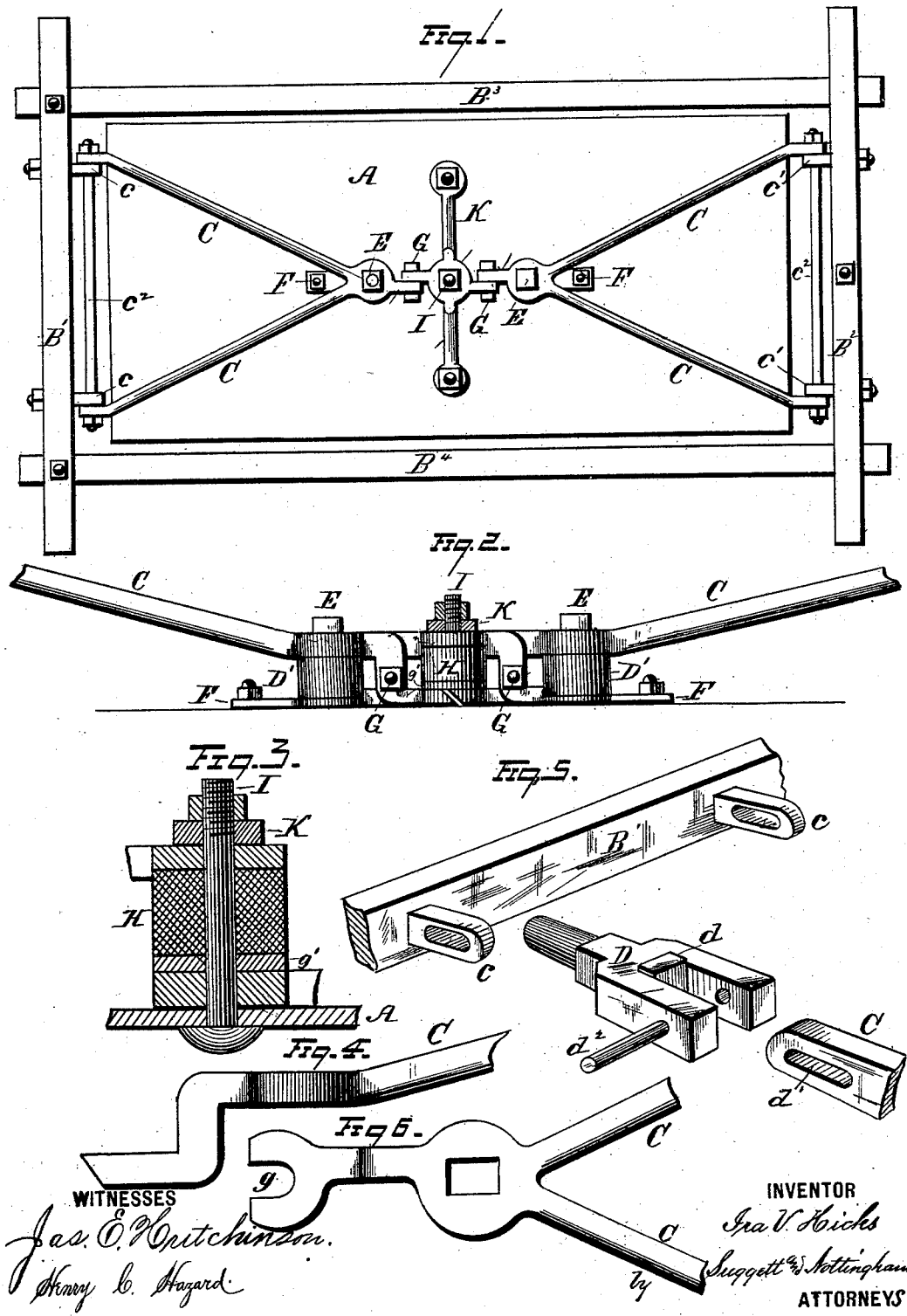

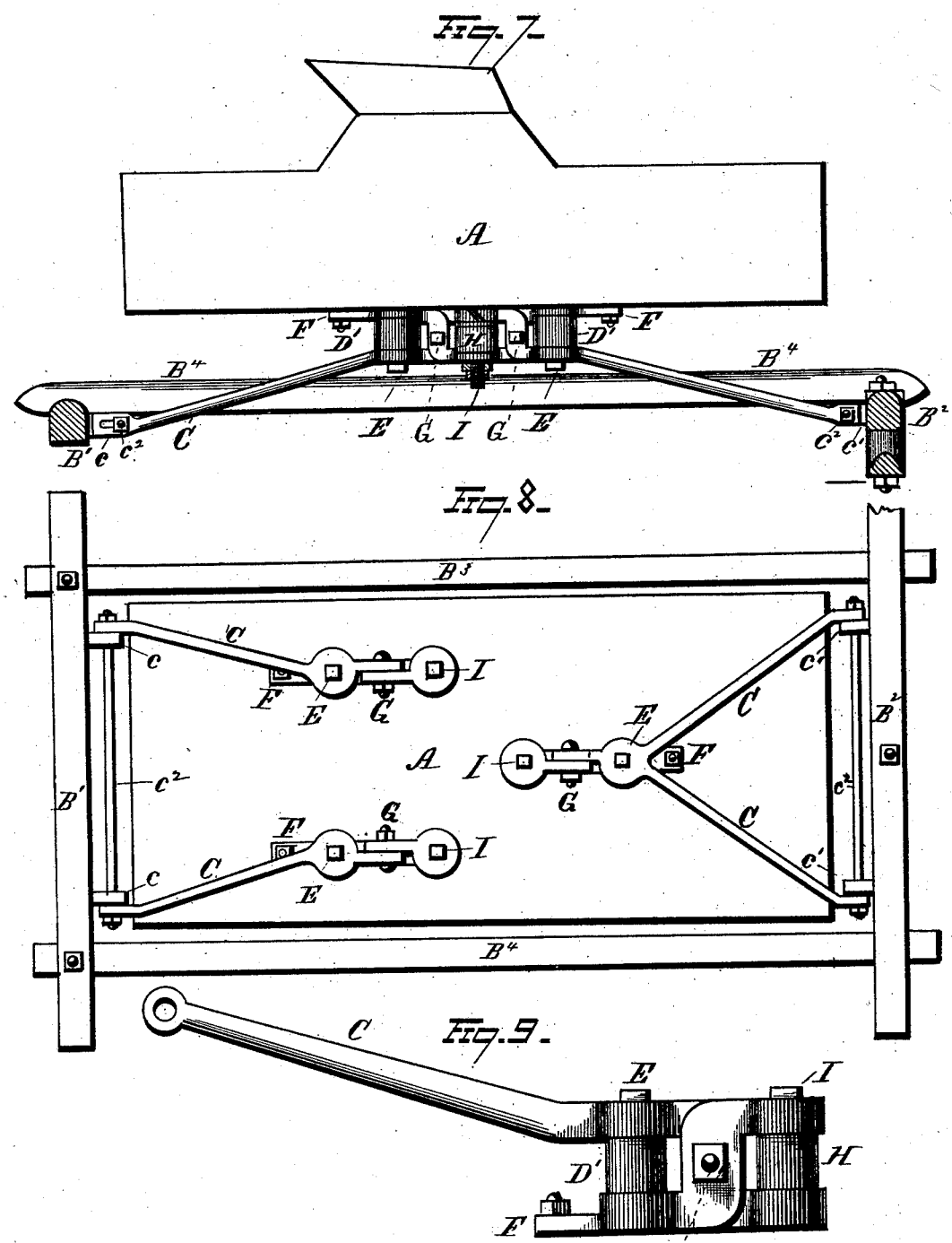

IRA V. HICKS, OF CORTLAND VILLAGE, NEW YORK.

IMPROVEMENT IN VEHICLE-SPRINGS.

Specification forming part of Letters Patent No. 222,701, dated December 16, 1879; application filed September 18, 1879.

*To all whom it may concern:*

Be it known that I, IRA V. HICKS, of Cortland Village, in the county of Cortland and State of New York, have invented certain new and useful Improvements in Springs for Vehicles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to certain improvements in side-bar and other vehicles, and has for its object to provide a cheaper, more durable, and more easily-riding vehicle than has heretofore been produced.

To this end the invention consists of two or more levers pivoted to the truck of a vehicle, and fulcrumed to hangers having spring-bearings secured to the body of the vehicle, the free ends of the levers resting upon an auxiliary spring-bearing, also attached to the body of the vehicle, as more fully hereinafter specified.

In the drawings, Figure 1 represents an inverted view of a vehicle showing my improvement. Fig. 2 represents a detached side elevation of the spring-bearings and the levers. Fig. 3 represents a sectional view of the auxiliary spring-bearing. Fig. 4 represents a detached view, showing the side of the free end and fulcrum of one of the supporting-levers. Fig. 5 represents detached views of the connections for securing the levers to the truck of the vehicle. Fig. 6 represents a plan view of the free end and fulcrum portion of one of the supporting-levers. Fig. 7 represents a side view of the vehicle with the exception of the wheels. Fig. 8 represents an inverted view of the vehicle, showing a modification of my invention; and Fig. 9 represents a detached view of one of the levers and spring-bearings employed in such modification.

The letter A designates the body of the vehicle, which may be of any approved pattern, and $B'$, $B^2$, $B^3$, and $B^4$ the portions of the truck of the vehicle upon which the body is supported. The letter C indicates a series of two or more levers pivoted to metal pieces $c$ and $c'$, secured to the parts $B'$ and $B^2$ of the truck by means of rods $c^2$ $c^2$, passing through the ends of said levers and metal pieces. The metal pieces $c$ are provided with longitudinal slots, so that the rod $c^2$ may slide therein, as required, when the springs are used.

As a substitute for this method of securing the levers to the parts $B'$ and $B^2$, a shackle, D, provided with a rubber piece, $d$, may be used. In such case the ends of the levers are provided with oblong openings, as shown at $d'$ in Fig. 5, and are pivoted to said shackle by means of a bolt, $d^2$, thus dispensing with the rods $c^2$ and $c^2$.

The letter $D'$ represents spring-bearings, each composed of a bolt, E, firmly fastened to a hanger, F, secured to the under side of the body of the vehicle, the levers being fulcrumed at G to said hangers. The free ends of said levers are bifurcated, as shown at $g$, and embrace a plate, $g'$, and spring-bearing H, secured, by means of a bolt, I, to the under side of the wagon, the lower end of said bolt being secured in a transverse brace, K, attached to the under side of the body of the vehicle. The plate $g'$ makes a firm surface for the working of the bifurcated ends of the levers, thereby preventing the spring-bearings from being quickly worn out by the constant compression of said ends of said levers.

In the modification shown in Figs. 8 and 9 of the drawings three levers are shown, two being pivoted to one end of the truck and the other to the opposite end. Said levers, in this instance, are fulcrumed to standards, as before mentioned; but the free end of each has a separate spring-bearing, H, said spring-bearing being attached at proper points to the bottom of the body of the vehicle, as before mentioned.

The views represented in Fig. 5 show the connections for securing the levers to the truck, either of which may be employed, as may be found convenient.

Having thus described the construction of my invention, I will now proceed to describe its operation.

The weight in the wagon-box presses down the levers, which compress the rubber bearings or springs and bring the bifurcated ends of the levers against the plate $g'$, thereby compressing the auxiliary spring, and the said bifurcated ends of the levers come together, making a tight joint, the said rubber bearings, by their elasticity, making springs, the longitudinal slots in the metal pieces $c$ allowing the necessary space for the levers to elongate by the action of the springs.

Coiled springs may be used in the place of rubber; but I prefer the latter.

Having thus described my invention, what I claim, and desire to secure by Letters Patent, is—

1. In combination with the truck and body of a vehicle, two or more levers loosely attached to the truck, and pivoted to a hanger secured to the body of the vehicle, the free ends of said levers bearing against a common spring secured to a hanger depending from the bottom of the vehicle-body, substantially as specified.

2. In combination with the levers secured to the truck and body of the vehicle by means of a hanger, as described, and the spring against which their free ends bear, the springs $D'$, forming additional bearings for the levers, substantially as and for the purposes specified.

3. The combination of the shackle D, the rubber piece to prevent rattling, and the slotted levers fitting into said shackle, and adapted to work backward and forward on the coupling-pin, substantially as described.

In testimony that I claim the foregoing as my own I affix my signature in presence of two witnesses.

IRA V. HICKS.

Witnesses:
 MORGAN L. WEBB,
 BENJ. L. WEBB.